(No Model.)
G. F. DE SOLOMÉ.
AUTOMATIC MEANS FOR OPENING AND CLOSING ELECTRIC CIRCUITS.
No. 344,948. Patented July 6, 1886.
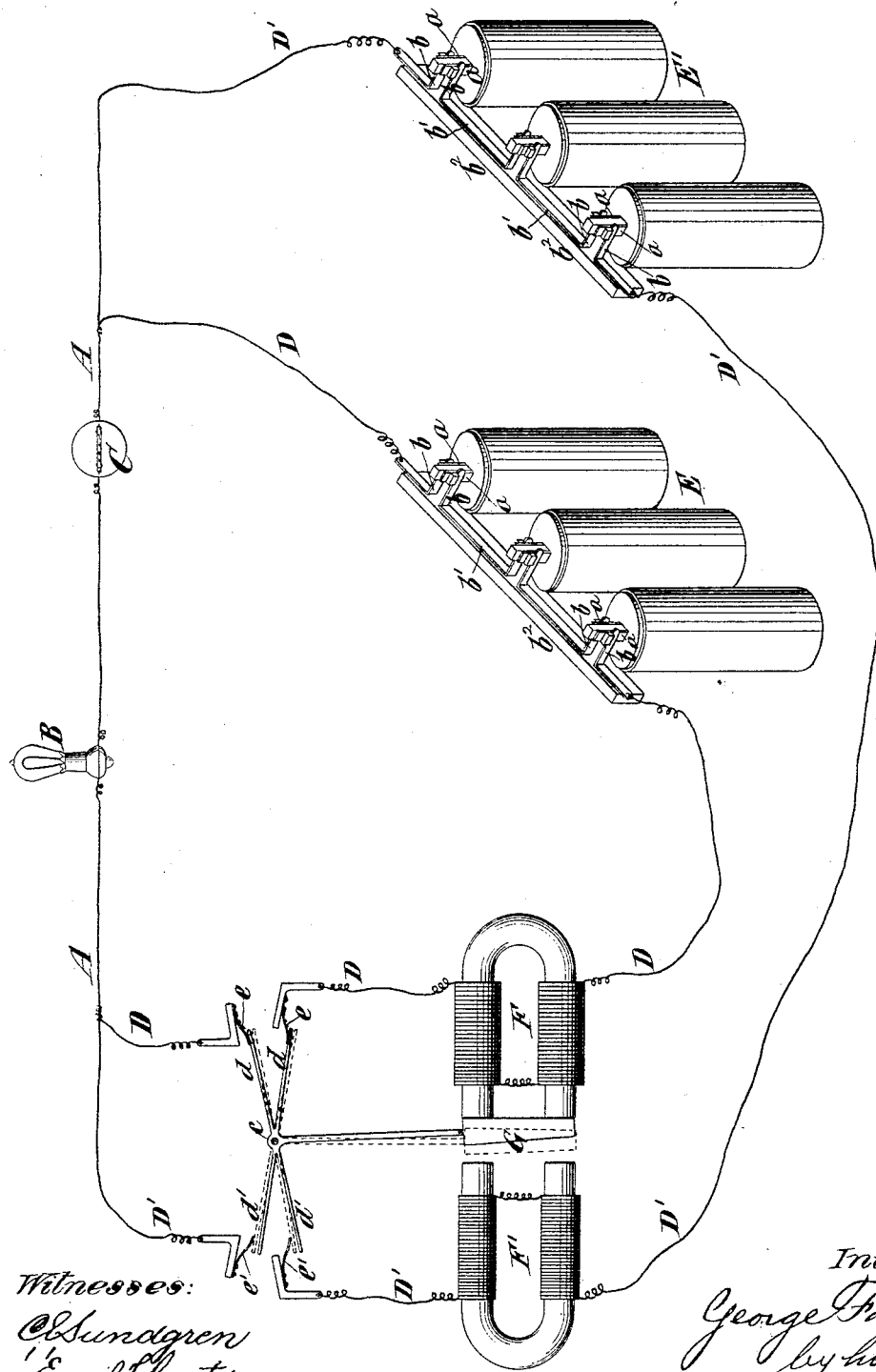
Witnesses:
C. Sundgren
Emil F. Carter
Inventor:
George F. de Solomé
by his attys
Brown & Hall

United States Patent Office.

GEORGE F. DE SOLOMÉ, OF NEW YORK, N. Y., ASSIGNOR TO J. SEAVER PAGE, OF SAME PLACE.

AUTOMATIC MEANS FOR OPENING AND CLOSING ELECTRIC CIRCUITS.

SPECIFICATION forming part of Letters Patent No. 344,948, dated July 6, 1886.

Application filed November 21, 1885. Serial No. 183,473. (No model.)

*To all whom it may concern:*

Be it known that I, GEORGE F. DE SOLOMÉ, of the city and county of New York, in the State of New York, have invented a new and useful Improvement in Automatic Means for Opening and Closing Circuits of Alternate Galvanic Batteries, of which the following is a specification.

My invention is more particularly intended for electric lighting in which it is desired to automatically close the circuit through two batteries alternately, in order that they may be used alternately, and each allowed a sufficient time for recuperation while the other is in use; but the invention may also be employed in connection with electric circuits for other purposes.

The invention consists, essentially, in the combination, with a main electric circuit and two branch circuits connected therewith and each containing an electric battery, of a circuit-breaker controlling the connection of the branch circuits with the main circuit, two electro-magnets of different powers arranged in the branch circuits, and an armature capable of movement in opposite directions by the electro-magnets and controlling the circuit-breaker, as more fully hereinafter described.

The accompanying drawing represents a main circuit, branch circuits containing batteries, and circuit-closing devices arranged and combined according to my invention.

In the drawing, A designates a main electric circuit, which contains an electric light, B, and the switch C; and D D' designate two branch circuits, which have in them two batteries, E E', consisting, as here represented, of three cells each. The pole-pieces $a$ of each battery-jar project above the lid thereof, and are embraced by spring-fingers $b$, which form part of metallic strips $b'$, secured to the bar or rod $b^2$. By means of these connections, which are similar to those shown and described in my application for United States Letters Patent, Serial No. 183,472, filed November 21, 1885, the circuit is closed through the several jars of each battery from end to end of the series of jars without any binding-screws or other devices, which are sometimes difficult to manipulate.

In the two branch circuits D D', I have represented electro-magnets, F F', of different powers. The magnet F is here represented as having a larger coil of wire than the magnet F', and is consequently of greater strength, one of these two magnets being of double the power of the other.

Between the magnets F F' is suspended an armature, G, which is pivoted at $c$, and has arms $d\ d\ d'\ d'$, which, by bearing against contacts $e\ e\ e'\ e'$ in the two branch circuits D D', close one or other of these circuits, according to whether the armature G is attracted by the magnet F or by the magnet F'.

In the position of parts shown in the drawing the armature G is by the power of the magnet F attracted to it, and the arms $d$, connected with the armature, make contact with the spring contact-fingers $e$ in the branch circuit D, and thereby close the circuit through the battery E and the branch D and the main circuit A. At the same time the arms $d'$ are out of contact with the fingers $e'$ in the branch circuit D', and consequently the circuit is broken through the branch circuit D', and the battery E' thereof is inactive. This operation continues until the battery E becomes weakened by use, when the armature G will drop away from the magnet F into the middle position, (shown by dotted lines,) and both the branch circuits will then be connected with the main circuit A. The current through the magnet F', which is of weaker power, will then be the stronger, as the batteries E' are freshly brought into use, and the armature G will be attracted over to the magnet F', and thereupon will make contact between the arms $d'$ and the contact-fingers $e'$, and will close the circuit through the branch circuit D', battery E', and main circuit A, at the same time breaking the electric continuity of the branch circuit D and throwing the battery E out of action and allowing it time to recuperate. When the battery E' becomes weakened by continued use, the armature G will drop away from the magnet F' to the central position, (shown by dotted lines in the drawing,) and the stronger magnet, F, will again attract the armature, closing the branch circuit D and breaking the electric continuity of the branch circuit D'. The two batteries will thereby be automatically brought into alternate use, and while either is being used the other battery will be allowed sufficient opportunity to recuperate and regain its normal strength.

What I claim as my invention, and desire to secure by Letters Patent, is—

The combination, with a main electric circuit and two branch circuits connected therewith and each containing an electric battery, of a circuit-breaker controlling the connection of the branch circuits with the main circuit, two electro-magnets of different powers arranged in the branch circuits, and an armature capable of movement in opposite directions by the electro-magnets, and controlling the circuit-breaker, substantially as herein described.

GEORGE F. DE SOLOMÉ.

Witnesses:
FREDK. HAYNES,
HENRY MCBRIDE.